(12) United States Patent
Peterson et al.

(10) Patent No.: US 8,584,344 B2
(45) Date of Patent: Nov. 19, 2013

(54) METHOD OF FORMING A FUNCTIONAL RAZOR CARTRIDGE

(75) Inventors: Mark Peterson, Reading (GB); Dominic Michael Piff, Little Sandhurst (GB)

(73) Assignee: The Gillette Company, Boston, MA (US)

( * ) Notice: Subject to any disclaimer, the term of this patent is extended or adjusted under 35 U.S.C. 154(b) by 513 days.

(21) Appl. No.: 12/796,701

(22) Filed: Jun. 9, 2010

(65) Prior Publication Data
US 2010/0319204 A1 Dec. 23, 2010

(30) Foreign Application Priority Data
Jun. 22, 2009 (EP) .................................. 09163388

(51) Int. Cl.
*B21B 1/46* (2006.01)
*B21K 23/00* (2006.01)
*B26B 21/54* (2006.01)
*G06F 19/00* (2011.01)

(52) U.S. Cl.
USPC ....... 29/527.1; 30/346.58; 700/120; 76/101.1

(58) Field of Classification Search
USPC ............... 29/527.1, 527.2, 525.14, 460, 428; 30/346.58; 700/120, 101.1, 119, 121; 76/101.1
See application file for complete search history.

(56) References Cited

U.S. PATENT DOCUMENTS

| 6,657,155 | B2 | 12/2003 | Abe et al. |
| 6,671,961 | B1 | 1/2004 | Santhagens Van Elbergen |
| 2003/0052105 | A1 | 3/2003 | Nagano et al. |
| 2005/0015175 | A1* | 1/2005 | Huang .......................... 700/121 |
| 2005/0172494 | A1 | 8/2005 | Aviza et al. |

FOREIGN PATENT DOCUMENTS

| WO | WO 94/19174 | 9/1994 |
| WO | WO 98/06560 | 2/1998 |

OTHER PUBLICATIONS

Abelson, Jenn. "Gillette Sharpens Its Focus on Women." *The Boston Globe* Jan. 4, 2009.

* cited by examiner

*Primary Examiner* — John C Hong
(74) *Attorney, Agent, or Firm* — Joanne N. Pappas; Kevin C. Johnson; Steven W. Miller

(57) ABSTRACT

A method of forming a functional razor cartridge for repeated shaving comprises rapid prototyping a housing of a razor cartridge. The housing has a front wall, a rear wall and opposing side walls disposed transverse to and between said front and rear walls. The method further comprises loading a metal insert with one or more elongate blade assemblies and disposing the metal insert in the housing such that the one or more blade assemblies extend between the opposing side walls of the housing.

11 Claims, 3 Drawing Sheets

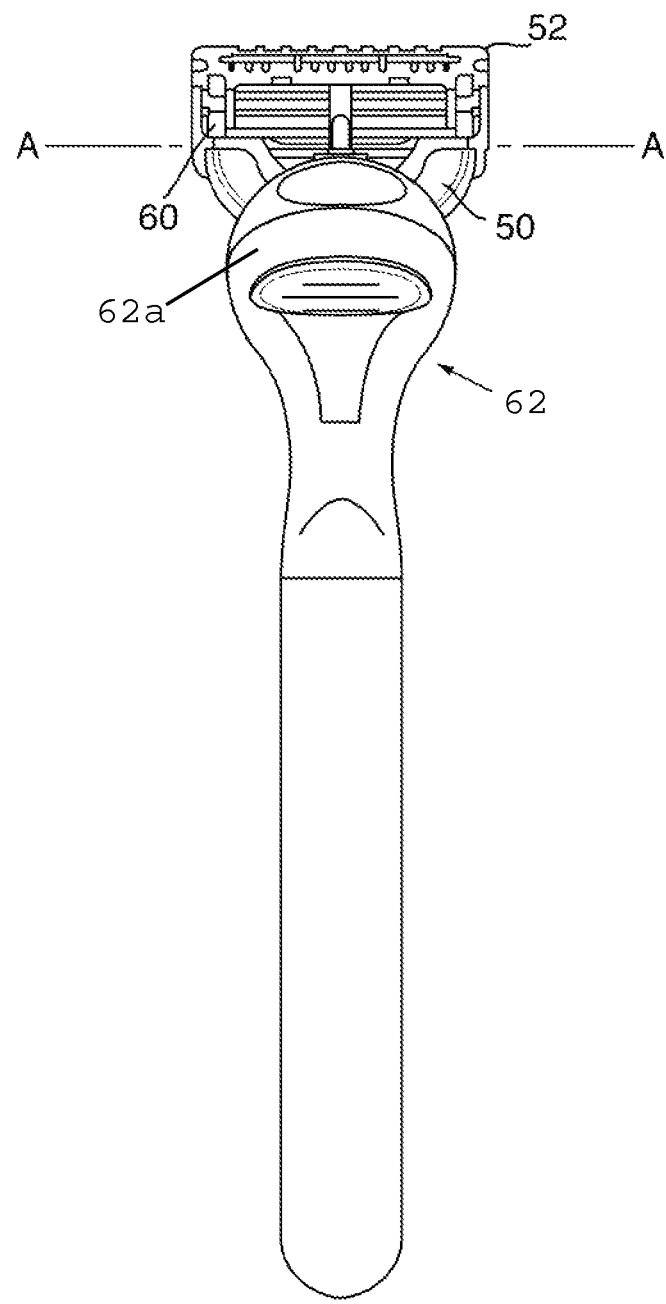

METHOD OF FORMING A FUNCTIONAL RAZOR CARTRIDGE

FIELD OF THE INVENTION

The present invention relates to a method of forming a functional razor cartridge using rapid prototyping, and a functional razor cartridge formed using rapid prototyping.

BACKGROUND OF THE INVENTION

Various forms of rapid prototyping are known for producing models or prototype parts. Rapid prototyping, or additive fabrication, takes virtual designs from e.g. computer aided design (CAD) programs and, using this data, builds a model of the design in a layered manner. One of the main advantages of using rapid prototyping/additive manufacturing is the ability to create almost any shape or geometric feature.

As such, rapid prototyping is frequently used in the concept stage of products that are otherwise manufactured using more traditional molding techniques. As rapid prototype methods and materials have become more sophisticated, rapid prototyping is being used more often to make workable products, as opposed to making simply models.

Rapid prototyping has been used in the fabrication of models of razor handles and cartridges for some time. However, these models have not had the requisite properties to enable them to be used for actual shaving, either because of inaccuracies in dimensions or because of the material that has been used. For example, materials used previously in the formation of model razor cartridges were unable to withstand exposure to hot water without changing in property. As a result, thus far razor cartridges made by rapid prototyping have been useful only for assessing the look, dimensions and interaction of different components of a razor and have not been functional for shaving.

Until now, functional test razor cartridges have been formed using traditional mold tools. By using traditional mold tools, materials can be chosen that are suitably durable and in which the makers can have confidence of accuracy of dimensions. However, molding requires a significant commitment in terms of cost and time and it is not possible to easily change dimensions or geometries of a cartridge once a mold tool has been manufactured. There is therefore a need for being able to form functional razor cartridges in a more efficient and flexible manner.

SUMMARY OF THE INVENTION

The present invention relates to a method of forming a functional razor cartridge for repeated shaving, comprising the steps of: a) rapid prototyping a housing of said razor cartridge, wherein said housing comprises a front wall, a rear wall and opposing side walls disposed transverse to and between said front and rear walls; b) loading a metal insert with one or more elongate blade assemblies; and disposing said metal insert in the housing such that said one or more blade assemblies extend between said opposing side walls.

The present invention further relates to a razor cartridge comprising a housing, having a front wall, a rear wall and opposing side walls disposed transverse to and between said front and rear walls; a metal insert located within the housing; and one or more blade assemblies disposed in said metal insert, said one or more blade assemblies being arranged to extend between said opposing side walls.

BRIEF DESCRIPTION OF THE DRAWINGS

Embodiments of the invention will hereinafter be described, by way of example, with reference to the accompanying drawings, in which:

FIG. 3 is a rear view of a razor encompassing the embodiment shown in FIG. 1.

DETAILED DESCRIPTION OF THE INVENTION

The invention is applicable to razor cartridges in general that are used in a wet shaving system.

Figure 1:
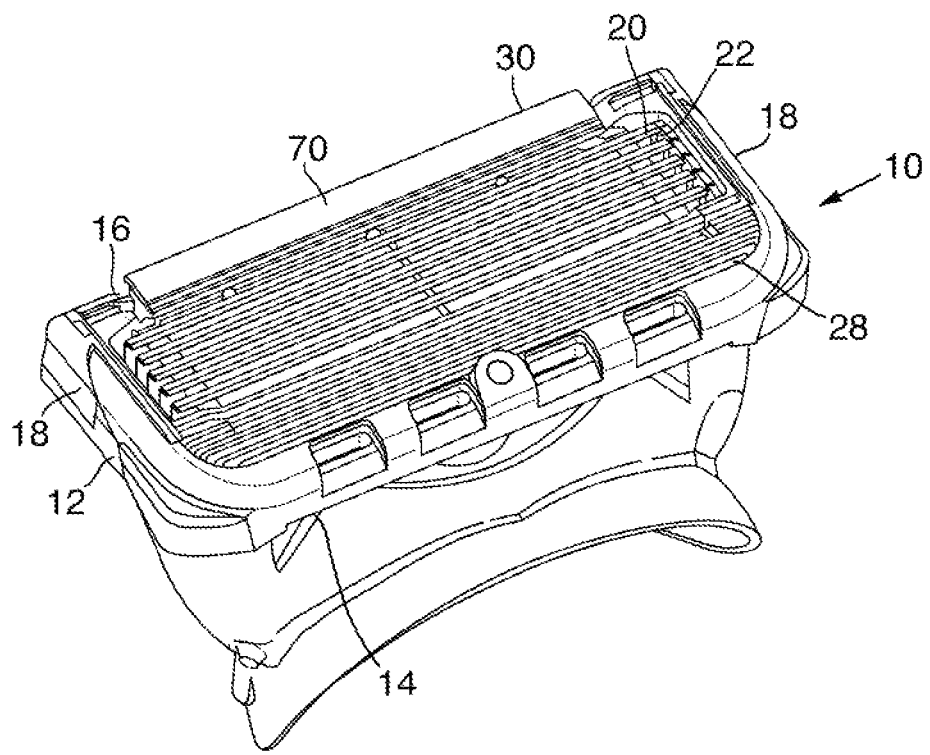
FIG. 1 is a front view of one possible embodiment of a razor cartridge.

FIG. 1 shows a razor cartridge 10 formed of a housing 12 having a front wall 14, rear wall 16 and opposing side walls 18. One or more blade assemblies 20 with sharp cutting edges 22 are mounted in a metal insert 24 (shown in FIG. 2) located within the housing such that the one or more blade assemblies 20 extend between the first and second opposing side walls 18. In the embodiments shown in FIGS. 1 to 3, the razor cartridge has five blade assemblies mounted therein. However, it will be understood that more or fewer blade assemblies may be mounted within the housing. The housing further has a guard 28 and cap 30 disposed respectively on the front wall 14 and rear wall 16.

The housing 12 is fabricated using a rapid prototyping method. Rapid prototyping, as referred to herein, is a method of automatically constructing physical objects using 3-dimensional printing technologies. Rapid prototyping involves a machine reading in data from a computer aided design (CAD) drawing and laying down successive layers of liquid, powder or sheet material. In this way, a model is built up from a series of cross-sections of the 3-dimensional CAD model. Examples of types of rapid prototyping include, but are not limited to, selective laser sintering (SLS), direct metal laser sintering (DMLS), digital light processing (DLP), fused deposition modeling (FDM), stereolithography (SLA), and electron beam melting (EBM). The specific method of rapid prototyping used is typically determined by the material to be used and the desired accuracy and quality of finish of the ultimate product.

In a preferred embodiment, the housing 12 is fabricated using an additive manufacturing that uses liquid ultra-violet curable photopolymer resin (UV-curable resin) and an ultra-violet laser to build parts a layer at a time. Ultra-violet light is applied to layers of UV-curable resin at a time to form a solid structure. Once a layer of solid structure has been formed, the solid layer is displaced to grant access of the ultra-violet light to a subsequent layer of liquid UV-curable resin. The ultra-violet light is applied to this subsequent layer of UV-curable resin and the process is repeated until a complete solid structure has been formed.

In the present invention, a rapid prototyping process known as digital light processing (DLP) is used. Specifically, a pool of liquid UV-curable resin is gathered on a platform and exposed to an ultra-violet light. Using a projection bulb, ultra-violet light is directed onto the pool of liquid using mirrors located beneath the pool of liquid UV-curable resin. Once the UV-curable resin has been formed into a layer of solid structure, the platform is moved out of the way to allow a further pool of liquid UV-curable resin to gather above the mirrors such that the ultra-violet light can be applied to this subsequent pool of UV-curable resin. The process is repeated until the solid structure has been formed in accordance with an image held on a corresponding computer. In the case of the present invention, an image of the housing 12 is held on the corresponding computer.

To form a housing 12 with sufficient strength and durability for application in a functional razor, a filler is suspended in the UV-curable resin. In the present invention, the filler is nanoparticles of aluminum oxide that are suspended in the UV-curable resin. However, other known fillers may alternatively be used; for example, crystalline silica or a ceramic filler may be used. UV-curable resin with aluminum oxide suspended therein has been found to have sufficient strength and durability to withstand pressure that may be applied to the housing during a normal shaving process. Furthermore, material as described herein that is formed of a filler suspended in UV-curable resin can be subjected to much higher temperatures compared with UV-curable resin without filler such that a housing formed of a filled UV-curable resin can withstand being held under varying degrees of hot water.

Use of digital light processing, and rapid prototyping in general, has various advantages over traditional molding methods. For example, with rapid prototyping it is possible to easily alter dimensions of a product. In the case of the housing, it is possible to easily make a razor cartridge larger or smaller than normal and thus experiment to find optimum dimensions. By comparison, with traditional molding techniques, a significant amount of time and expense has to be committed each time a different mold is required and it is not possible to make simple alterations. As the same manufacturing equipment can be used each time a different housing is rapid prototyped, rapid prototyping provides a quicker, more efficient means to experiment with different forms of a product before committing to the cost of making molds for mass production. In a field such as razor cartridges where small changes can make a significant difference to performance of a razor cartridge, having this flexibility in a functional razor cartridge is very valuable.

Figure 2:
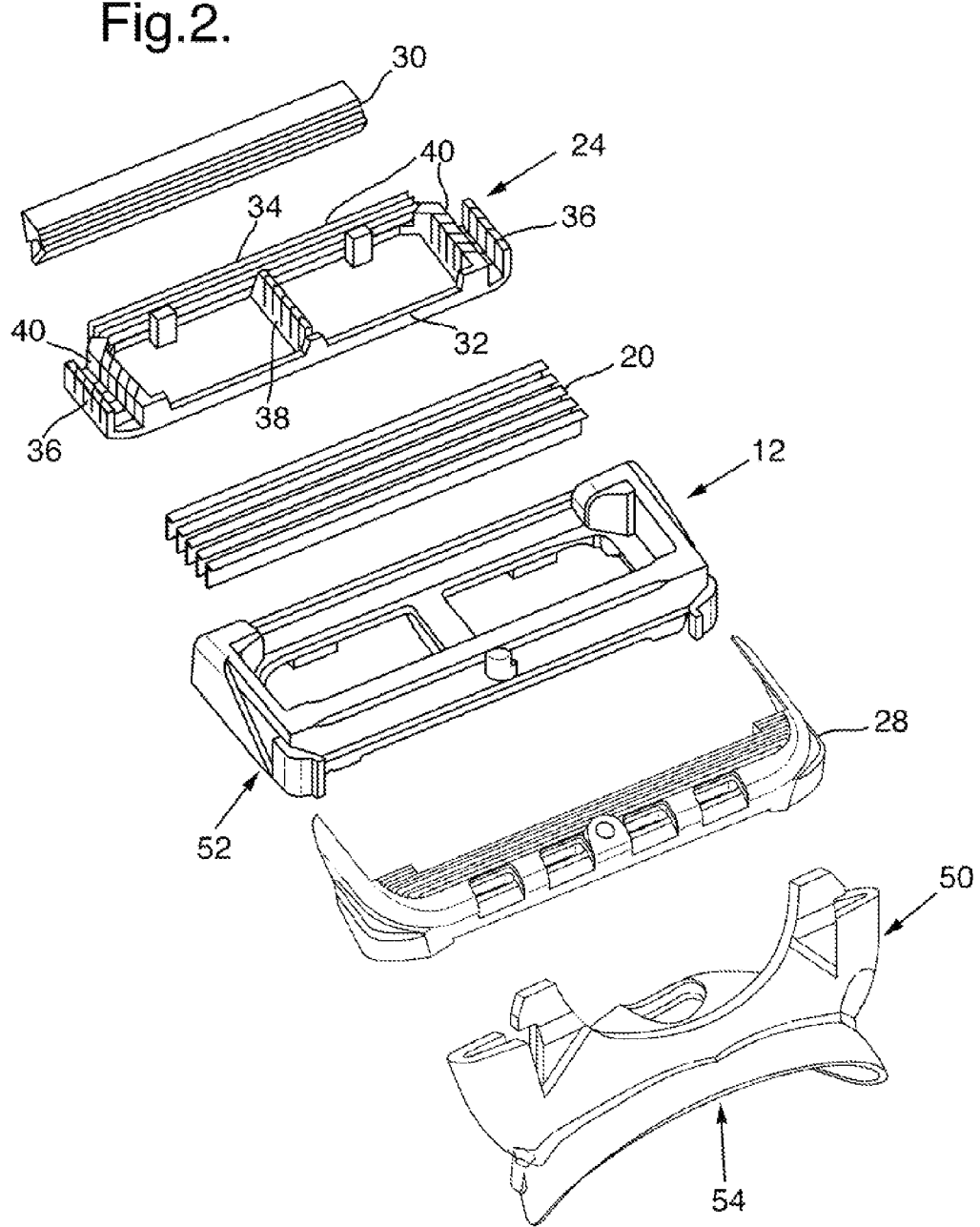
FIG. 2 is an exploded view of component parts of the razor cartridge of FIG. 1.

FIG. 2 shows an exploded view of the component parts of an embodiment of a razor cartridge of the present invention. Specifically, FIG. 2 shows a metal insert 24, having a front wall 32, a rear wall 34 and opposing side walls 36 extending between and transverse to the front and rear walls 32, 34. A strut 38 is provided partway along the length of the front and rear walls 32, 34 and extends between the front and rear walls 32, 34 in a direction substantially parallel to the opposing side walls 36. One or more slots 40 are provided in the opposing side walls 36 and the strut 38 for receiving therein one or more blade assemblies 20, such that the blade assemblies extend in a direction substantially parallel to the front and rear walls 32, 34.

Following rapid prototyping of the housing 12, one or more blade assemblies 20 are loaded into the metal insert 24, and the metal insert 24 is located in the housing 12 such that the blade assemblies 20 extend between the opposing side walls 18 of the housing 12. The metal insert 24 is bonded to the housing glue. The metal insert 24 is further secured in place with clips 60, shown in FIG. 3. The dimensions and positioning of the slots 40 determine the resulting geometries of the blade assemblies 20 once the metal insert 24 is located in the housing 12. Accordingly, minor changes to the dimensions of the slots 40 can significantly impact the performance of a functional razor.

The metal insert 24 may be manufactured by a standard subtractive machining process, for example by milling, grinding and wire eroding a block of steel until arriving at the finished required shape. In a preferred embodiment, the metal insert 24 is formed by direct metal laser sintering (DMLS), a form of rapid prototyping. The slots 40 are cut into the opposing side walls 36 and strut 38 of the metal insert using wire erosion. Direct metal laser sintering, as referred to herein, is a process where metal powder is fused into a solid metal structure by melting the metal powder using a focused laser beam. Use of DMLS results in a solid metal product having nearly identical properties to a molded product and the use of wire erosion enables slots to be formed with accuracy comparable to slots that are formed in a molded metal insert. The overall process provides the ability to make a metal insert 24 of any required dimensions with the accuracy of a mold, and with the flexibility of forming a metal insert that is compatible with different sizes of housing 12. Forming a metal insert 24 by the above described process provides a time efficient way of preparing different inserts with varied angles, positioning of slots and overall size, without suffering a reduction in quality. Once the metal insert 24 has been formed, blade assemblies 20 are loaded into slots of the metal insert before the metal insert is placed in the housing 12.

The level of comfort obtained with any given wet shaving razor cartridge is influenced strongly by the shaving geometry, which is the relative positioning of the skin contacting components. Important parameters of the shaving geometry include the blade exposure which is the distance by which the tip of the blade edge projects above, or is retracted below, a plane which is tangential to the skin contacting parts next in front and next behind the blade edge, the blade tangent angle (also known as the blade shaving angle) which is the angle at which the plane of the blade is inclined to a plane which is tangential to the guard and the cap surfaces (the tangent plane), and the blade span which is the distance by which the blade edge is spaced from the skin contacting element immediately in front of the blade edge, as seen in a plane which is tangential to the blade edge and the skin contacting element in front of it. A progressive blade exposure may be used in the present invention as detailed in U.S. Pat. No. 6,212,777.

There are many metals available for use with DMLS or traditional molding techniques that could be used to form a metal insert having the required properties of strength, durability and reliability of accuracy of the slots. For example, the metal insert could be formed of stainless or hardenable steel, cobalt chrome or other metals with similar properties. In a preferred embodiment, the metal insert is formed of stainless steel or other non-ferrous metals. By locating the metal insert in the rapid prototyped housing 12, the combined structure has sufficient strength and durability to withstand the force subjected on a razor cartridge when it is used repeatedly for shaving.

FIG. 2 further shows a connecting member 50 affixed to an underside 52 of the housing 12. The connecting member 50 has a receiving section 54 to which the end 62a of a razor handle 62 (shown in FIG. 3) may be attached. The connecting member 50 enables pivotal movement of the housing 12 relative to a razor handle when, in use, the razor cartridge 10 is pressed against an area of skin. The pivot axis A extends substantially parallel to the one or more blade assemblies 20. The connecting member 50 may be formed using traditional molding techniques. In a preferred embodiment, the connecting member 50 is formed by selective laser sintering (SLS), a form of rapid prototyping. SLS, as referred to herein, is a process where high power laser is used to fuse small particles of glass, plastic, ceramic or metal together into a mass representing a 3-dimensional object. The laser selectively fuses powdered material by scanning cross-sections generated from a 3-dimensional design, for example a computer aided design, on the surface of a powder bed. After each cross-section is scanned, the powder bed is lowered by one layer thickness, a new layer is applied on top, and the process is repeated until the model is completed.

The function of the connecting member 50 requires that the connecting member 50 is suitably flexible and hard wearing to withstand constant movement between the housing of the razor cartridge and a razor handle. In embodiments, ground nylon is used to form the connecting member 50. However, it will be appreciated that other known polymers, for example polypropylene, could also be used.

As set out above, the housing 12 further comprises a guard 28 at a forward portion. The guard contacts a shaver's skin immediately ahead of the plurality of blade assemblies 20. The guard may be located within the housing 12 or it may extend over one or more of the front 14 or opposing side walls 18 of the housing. The guard 28 may comprise a plurality of elastomeric fins 42. Such fins may take the form of substantially parallel elongations that run a length of the guard. Alternatively, the fins may comprise a plurality of curved projections, e.g. circular tubes, semicircular projections, chevron shaped projections and combinations thereof.

The cap 30 is disposed after the plurality of blade assemblies within the housing adjacent the rear wall 16. The cap 30 is arranged to contact the skin directly behind the plurality of blade assemblies 22 during a shaving stroke. In the case of both the guard 28 and the cap 30, each may comprise additional elements that are also joined to the housing 12. The cap 30 may comprise a lubricating strip 70. Such a lubricating strip may comprise skin conditioning agents that improve the appearance and sensation encountered by the shaver upon completion of the shaving stroke. The lubricating strip may comprise a shaving enhancement product, such as a lubricant which gradually leaches out of the strip material during shaving. Moreover, the positions of the fins and the lubricating strip may be alternated so that the fins are on the cap and the lubricating strip is disposed on the guard.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of forming a functional razor cartridge for repeated shaving, said method comprising the steps of:
    a) rapid prototyping a housing of said razor cartridge, wherein said housing comprises a front wall, a rear wall and opposing side walls disposed transverse to and between said front and rear walls;
    b) rapid prototyping a metal insert, the metal insert comprising a front wall, a rear wall, opposing side walls disposed transverse to and between said front and rear walls and a strut (38) extending between the front and rear walls;
    c) wire eroding said opposing side walls and said strut to form slots for receiving therein said one or more elongate blade assemblies;
    d) loading the metal insert with one or more elongate blade assemblies; and
    e) disposing said metal insert in the housing such that said one or more blade assemblies extend between said opposing side walls.

2. A method as claimed in claim 1, wherein the housing is formed in layers and step a) comprises:
    f) applying ultra-violet light to a first layer of ultra-violet curable resin to form a first layer of said housing;
    g) displacing said first layer of said housing to grant exposure of the ultra-violet light to a second layer of ultra-violet curable resin;
    h) applying ultra-violet light to said second layer of ultra-violet curable resin to form a second layer of said housing;
    i) repeating steps g) and h) for the second and subsequent layers of ultra-violet curable resin to form said housing.

3. A method as claimed in claim 2, wherein the ultra-violet curable resin has suspended therein a filler.

4. A method as claimed in claim 2, wherein the filler is aluminum-oxide.

5. A method as claimed in claim 1, wherein the method of rapid prototyping of step a) is digital light processing.

6. A method as claimed in claim 1, wherein step b) comprises:
    melting metal powder with a laser beam; and
    fusing said melted metal powder to form said metal insert.

7. A method as claimed in claim 6, wherein said metal powder is stainless steel.

8. A method as claimed in claim 1, wherein the method of rapid prototyping of step b) is direct laser metal sintering.

9. A method as claimed in claim 1, wherein the razor cartridge comprises a connecting member pivotally attached to an underside of the housing, wherein said connecting member comprises a receiving member that pivotally connects the housing to a razor handle, wherein the method further comprises:
    j) rapid prototyping said connecting member.

10. A method as claimed in claim 9, wherein step j) comprises using a laser to fuse together small particles to form said connecting member, wherein said small particles are small particles of nylon.

11. A method as claimed in claim 9, wherein the method of rapid prototyping of step j) is selective laser sintering.

* * * * *